United States Patent
Kishore et al.

(10) Patent No.: US 12,538,209 B2
(45) Date of Patent: Jan. 27, 2026

(54) WIRELESS NETWORK SIGNALING WITH IMPROVED POWER EFFICIENCY

(71) Applicant: Morse Micro Pty. Ltd., Surrey Hills (AU)

(72) Inventors: Chikkam Rama Kishore, Sydney (AU); Aman Shrestha, Sydney (AU); David Goodall, Sydney (AU)

(73) Assignee: Morse Micro Pty. Ltd., Surrey Hills (AU)

( * ) Notice: Subject to any disclaimer, the term of this patent is extended or adjusted under 35 U.S.C. 154(b) by 503 days.

(21) Appl. No.: 18/078,258

(22) Filed: Dec. 9, 2022

(65) Prior Publication Data

US 2023/0362794 A1 Nov. 9, 2023

(30) Foreign Application Priority Data

May 3, 2022 (AU) .................. 2022901159

(51) Int. Cl.
*H04W 48/10* (2009.01)
*H04W 52/02* (2009.01)
*H04W 84/12* (2009.01)

(52) U.S. Cl.
CPC ....... *H04W 48/10* (2013.01); *H04W 52/0216* (2013.01); *H04W 84/12* (2013.01)

(58) Field of Classification Search
CPC .. H04W 48/10; H04W 52/0216; H04W 84/12
USPC ....................................................... 455/507
See application file for complete search history.

(56) References Cited

U.S. PATENT DOCUMENTS

| | | | | |
|---|---|---|---|---|
| 10,027,592 | B1* | 7/2018 | Guo | H04L 47/28 |
| 11,166,235 | B2* | 11/2021 | Moner Poy | H04L 49/90 |
| 11,310,724 | B2* | 4/2022 | Pandey | H04W 12/041 |
| 11,606,750 | B2* | 3/2023 | Ahn | G06F 1/3209 |
| 12,476,857 | B1* | 11/2025 | Meesaraganda | H04L 27/2623 |
| 2009/0103501 | A1* | 4/2009 | Farrag | H04W 74/02 370/337 |
| 2009/0225682 | A1* | 9/2009 | Grote-Lopez | H04L 41/0866 370/255 |
| 2014/0233478 | A1* | 8/2014 | Wentink | H04W 84/12 370/329 |
| 2014/0241226 | A1* | 8/2014 | Jia | H04W 48/14 370/311 |
| 2015/0244619 | A1* | 8/2015 | Zheng | H04L 1/0061 370/392 |

(Continued)

*Primary Examiner* — April G Gonzales
(74) *Attorney, Agent, or Firm* — Polsinelli PC

(57) ABSTRACT

Systems and techniques are provided for performing wireless communications. In some aspects, an access point (AP) determines if buffered data traffic is available that will be advertised to one or more wireless communication devices using a beacon frame scheduled for broadcast by the AP. The AP broadcasts a pre-determined frame in response to determining buffered data traffic is not available before broadcasting the beacon frame. A wireless communication device exits a low-power mode to receive an upcoming beacon frame or receive a pre-determined frame broadcast by the AP. Based on receiving the pre-determined frame, the wireless communication device determines that the upcoming beacon frame does not advertise buffered data traffic addressed to the wireless communication device and returns to the low-power mode after decoding at least a portion of the pre-determined frame.

30 Claims, 8 Drawing Sheets

(56) References Cited

U.S. PATENT DOCUMENTS

| | | | | |
|---|---|---|---|---|
| 2015/0249529 A1* | 9/2015 | Zheng | .................... | H04L 1/1896 370/336 |
| 2015/0327262 A1* | 11/2015 | Kwon | ............... | H04W 72/0446 370/329 |
| 2015/0373579 A1* | 12/2015 | Xu | .................... | H04W 28/0289 370/230 |
| 2016/0007247 A1* | 1/2016 | Lee | .................. | H04W 36/0066 370/331 |
| 2016/0330788 A1* | 11/2016 | Zheng | .............. | H04W 28/0205 |
| 2016/0337869 A1* | 11/2016 | Dai | ........................ | H04W 16/10 |
| 2017/0064741 A1* | 3/2017 | Zhou | ............... | H04W 74/0816 |
| 2018/0213567 A1* | 7/2018 | Han | ..................... | H04B 17/318 |
| 2019/0045461 A1* | 2/2019 | Fang | .................. | H04W 52/245 |
| 2019/0215132 A1* | 7/2019 | Malisetty | ............. | H04W 72/541 |
| 2021/0212118 A1* | 7/2021 | Lu | ..................... | H04W 74/0816 |
| 2022/0006591 A1* | 1/2022 | Han | .......................... | G01S 7/41 |
| 2022/0345187 A1* | 10/2022 | Merlin | ................. | H04B 7/0658 |
| 2022/0346010 A1* | 10/2022 | Zhou | ................ | H04W 52/0229 |
| 2023/0388926 A1* | 11/2023 | Kishore | ............ | H04W 28/0278 |
| 2024/0389035 A1* | 11/2024 | Wadsworth | ......... | H04W 52/346 |
| 2025/0305851 A1* | 10/2025 | Ali | ..................... | G01C 21/1652 |

\* cited by examiner

WIRELESS NETWORK SIGNALING WITH IMPROVED POWER EFFICIENCY

CROSS-REFERENCE TO RELATED APPLICATION

The present application claims priority from Australian provisional patent application number 2022901159 filed on May 3, 2022, the contents of which are incorporated herein by cross-reference.

FIELD

The present disclosure generally relates to wireless communications. For example, aspects of the present disclosure are related to beacon frame signaling in a Wireless Local Area Network (WLAN).

BACKGROUND

Wireless communications systems are deployed to provide various telecommunication services, including telephony, video, data, messaging, broadcasts, among others. These systems may be multiple-access systems capable of supporting communication with multiple users by sharing the available system resources (e.g., such as time, frequency, and power). Multiple-access systems can be based on code division multiple access (CDMA), frequency division multiple access (FDMA), time division multiple access (TDMA), and orthogonal frequency division multiple access (OFDMA), etc.

A wireless network, for example a wireless local area network (WLAN) such as a Wi-Fi (e.g., Institute of Electrical and Electronics Engineers (IEEE) 802.11) network may include one or more access points (APs) that may communicate with one or more stations (STAs) or mobile devices. The one or more APs may provide a shared wireless communication medium for use by multiple STAs. An AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

Beacon frames are used in IEEE 802.11 based WLANs as management frames. Beacon frames contain all the information about the network. For example, beacon frames can contain or otherwise indicate the configuration of the corresponding network. Beacon frames are transmitted periodically and have a number of functions, including the announcement of the presence of a WLAN, synchronizing the members of a service set, and signaling the presence of buffered data traffic for members of the service set. A WLAN can include one or more access points (APs) and stations (STAs). A single AP and an associated set of STAs can be referred to as a basic service set (BSS), which is managed by the respective AP. A BSS can be identified to users by a service set identifier (SSID), as well as to other devices by a basic service set identifier (BSSID), which may be a medium access control (MAC) address of the respective AP. Beacon frames are transmitted by the AP in an infrastructure basic service set (BSS). In an independent basic service set (IBSS) network, wireless clients (e.g., STAs) can communicate directly without using an AP. In an IBSS network, beacon generation is distributed among the stations. When having many SSIDs on non-overlapping channels, beacon frames can consume a significant amount of airtime and degrade performance even when most of the networks are idle. IEEE 802.11ah is a wireless networking standard that uses sub-1 GHz license-exempt bands to provide extended range Wi-Fi networks. 802.11ah also benefits from lower energy consumption, allowing the creation of large groups of stations or sensors that cooperate to share signals, supporting the concept of the Internet of Things (IoT). Each world region supports different sub-bands, and the subchannels number depends on the starting frequency of the sub-band it belongs to.

IEEE 802.11ah beacon frames are extended in length, when compared to the other 802.11 WLANs, due to the lower frequency of operation. For example, an 801.11ah beacon frame may have an airtime duration of approximately 3 milliseconds (ms), while an 802.11n beacon frame may have an airtime duration of approximately 1 ms. Beacons are aimed to be sent at a target beacon transmission time (TBTT) at regular intervals. Buffered data traffic may be advertised in each beacon or at a wider interval, for example in every third beacon. Receiving beacons at regular intervals in 802.11 WLANs requires a significant amount of power, as generally, stations (STAs) must first wake up from a low power consumption mode (e.g., sleep-mode) to receive the beacon and, in a majority of cases, will then return to sleep-mode when no buffered data traffic for the STA is advertised in the specific beacon. Buffered data traffic may consist of group addressed traffic to multiple STAs or direct addressed traffic to specific STAs.

BRIEF SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method of wireless communication performed by a wireless access point (AP) is provided. The method includes: determining if the wireless AP has buffered data traffic that will be advertised to one or more wireless communication devices in a beacon frame scheduled for broadcast by the wireless AP, wherein the wireless AP and the one or more wireless communication devices are included in a same wireless local area network (WLAN); in response to determining that buffered data traffic is not available for the plurality of wireless communication devices, broadcasting, using the wireless AP, a pre-determined frame on the WLAN to signal the buffered data traffic is not available; and broadcasting, using the wireless AP, a beacon frame on the WLAN.

In another example, an apparatus of a wireless access point (AP) is provided that includes at least one memory (e.g., configured to store data) and at least one processor (e.g., implemented in circuitry) coupled to the at least one memory. The processor is configured to determine if the wireless AP has buffered data traffic that will be advertised to one or more wireless communication devices in a beacon frame scheduled for broadcast by the wireless AP, wherein the wireless AP and the one or more wireless communication devices are included in a same wireless local area network (WLAN); in response to determining that buffered data traffic is not available for the one or more wireless communication devices, broadcast a pre-determined frame on the WLAN to signal the buffered data traffic is not available; and broadcast a beacon frame on the WLAN.

In some embodiments, the pre-determined frame is a null data packet (NDP) frame, and the NDP frame comprises one or a combination of a clear to send (CTS) frame, a NDP paging frame, and a clear to send-to-self (CTS-to-self) frame. In one example, the CTS-to-self frame has a duration of zero and having a receiver address and a transmitter address that are the same.

In some embodiments, a CTS duration parameter of the CTS frame is adjusted, wherein the CTS duration parameter is indicative of one or more network conditions or network configurations signaled by the wireless AP to the one or more wireless communication devices.

In some embodiments, the wireless AP broadcasts the pre-determined frame at a target beacon transmission time (TBTT) associated with the beacon frame.

In some embodiments, the wireless AP broadcasts the beacon frame using a pre-determined offset after the TBTT.

In some embodiments, the wireless AP broadcasts the pre-determined frame before a target beacon transmission time (TBTT) associated with the beacon frame.

In some embodiments, the wireless AP broadcasts the pre-determined frame using an offset time interval relative to the TBTT; and the offset time interval is determined as a sum of a transmission time associated with the wireless AP broadcasting the pre-determined NDP frame and a short inter-frame space (SIFS) time associated with the plurality of wireless communication devices.

In some embodiments, determining if the wireless AP has buffered data traffic comprises: checking, using the wireless AP, for buffered group-addressed data addressed to the one or more wireless communication devices.

In some embodiments, determining that buffered data traffic is not available is based on checking, using the wireless AP, a bitmap control byte, a partial virtual bitmap (PVB), or both the bitmap control byte and PVB of a traffic indication map (TIM) element included in the beacon frame.

In some embodiments, the beacon frame is a delivery traffic indication map (DTIM) beacon frame.

In some embodiments, the beacon frame is an 802.11ah beacon frame.

In some embodiments, the wireless AP can further be configured to determine a pre-determined timeout period indicating a maximum time allowed for continuously broadcasting the pre-determined frames before broadcasting the beacon frames, and skip broadcasting the pre-determined frame when an elapsed time from the wireless AP continuously broadcasting the pre-determined frames is greater than the pre-determined timeout period.

In another illustrative example, a method for wireless communication by a wireless communication device is provided. The method includes: exiting, by the wireless communication device, a low-power mode in order to receive an upcoming beacon frame scheduled for broadcast on a wireless local area network (WLAN) by a wireless access point (AP); receiving a pre-determined frame broadcast on the WLAN by the wireless AP; determining, based on receiving the pre-determined frame, that the upcoming beacon frame does not advertise buffered data traffic addressed to the wireless communication device; and returning, by the wireless communication device, to a low-power mode after decoding at least a portion of the pre-determined frame.

In another example, an apparatus of a wireless communication device is provided that includes at least one memory (e.g., configured to store data) and at least one processor (e.g., implemented in circuitry) coupled to the at least one memory. The processor is configured exit a low-power mode in order to receive an upcoming beacon frame scheduled for broadcast on a wireless local area network (WLAN) by a wireless access point (AP); receive a pre-determined frame broadcast on the WLAN by the wireless AP; determine, based on decoding the pre-determined frame, that the upcoming beacon frame does not advertise buffered data traffic addressed to the wireless communication device; and returning, by the wireless communication device, to the low-power mode after decoding at least a portion of the pre-determined NDP frame.

In some embodiments, the wireless communication device returns to the low-power mode prior to the wireless AP transmitting the upcoming beacon frame or skip receiving the upcoming beacon frame.

In some embodiments, exiting the low-power mode is based on a target beacon transmission time (TBTT) associated with the upcoming beacon frame scheduled for broadcast on the WLAN.

In some embodiments, the wireless communication device exits the low-power mode before a target beacon transmission time (TBTT) associated with the upcoming beacon frame.

In some embodiments, the pre-determined frame is received at an offset time interval relative to the TBTT; and the offset time interval is determined as a sum of a transmission time associated with the wireless AP broadcasting the pre-determined frame and a Short Inter-frame Space (SIFS) time associated with the wireless communication device.

In some embodiments, the wireless communication device returning to the low-power mode is further based on determining that an elapsed time since the wireless communication device last received or decoded a beacon frame broadcast from the wireless AP is less than a pre-determined timeout period.

In some embodiments, in response to the elapsed time being greater than or equal to the pre-determined timeout period, the wireless communication device waits to receive the upcoming beacon frame, wherein the upcoming beacon frame is broadcast on the WLAN by the wireless AP after the pre-determined frame.

In some embodiments, the wireless communication device receives the upcoming beacon frame broadcast on the WLAN by the wireless AP; and synchronizes an internal timing synchronization function (TSF) time associated with the wireless communication device with a TSF time associated with the wireless AP.

In some embodiments, the elapsed time value is reset to zero; and the wireless communication device returns to the low-power mode after performing TSF time synchronization.

In some embodiments, the upcoming beacon frame is a delivery traffic indication map (DTIM) beacon frame.

In some embodiments, the upcoming beacon frame is an 802.11ah beacon frame.

In some embodiments, the pre-determined frame is the upcoming beacon frame including a signal field configured to signal a presence of the buffered data traffic. The wireless communication device returns to the low-power mode after decoding a portion of the beacon frame, for example, after decoding the signal field of the beacon frame. In this way, the wireless communication device returns to the low-power mode without processing the entire beacon frame when the signal field indicates the buffered data traffic is not available.

In some embodiments, the pre-determined frame is a null data packet (NDP) frame, and the NDP frame may be one or a combination of a clear to send (CTS) frame, a NDP paging frame, and a clear to send-to-self (CTS-to-s elf) frame.

In some embodiments, the wireless communication device determines a CTS duration parameter associated with the CTS frame, wherein the CTS duration parameter is indicative of one or more network conditions or network configurations signaled by the wireless AP to the wireless communication device.

In one embodiment, the processor in the wireless communication device is configured to cause the wireless communication device to return to the low-power mode prior to the wireless AP transmitting the upcoming beacon frame or return to the low-power mode without receiving the upcoming bacon frame. In one embodiment, the wireless communication device returns to the low-power mode based on determining that an elapsed time since the wireless communication device last received or decoded a beacon frame broadcast from the wireless AP is less than a pre-determined timeout period. In response to the elapsed time being greater than or equal to the pre-determined timeout period, the wireless communication device waits to receive the upcoming beacon frame transmitted by the wireless AP after the pre-determined frame.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following drawing figures.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Figure 1:
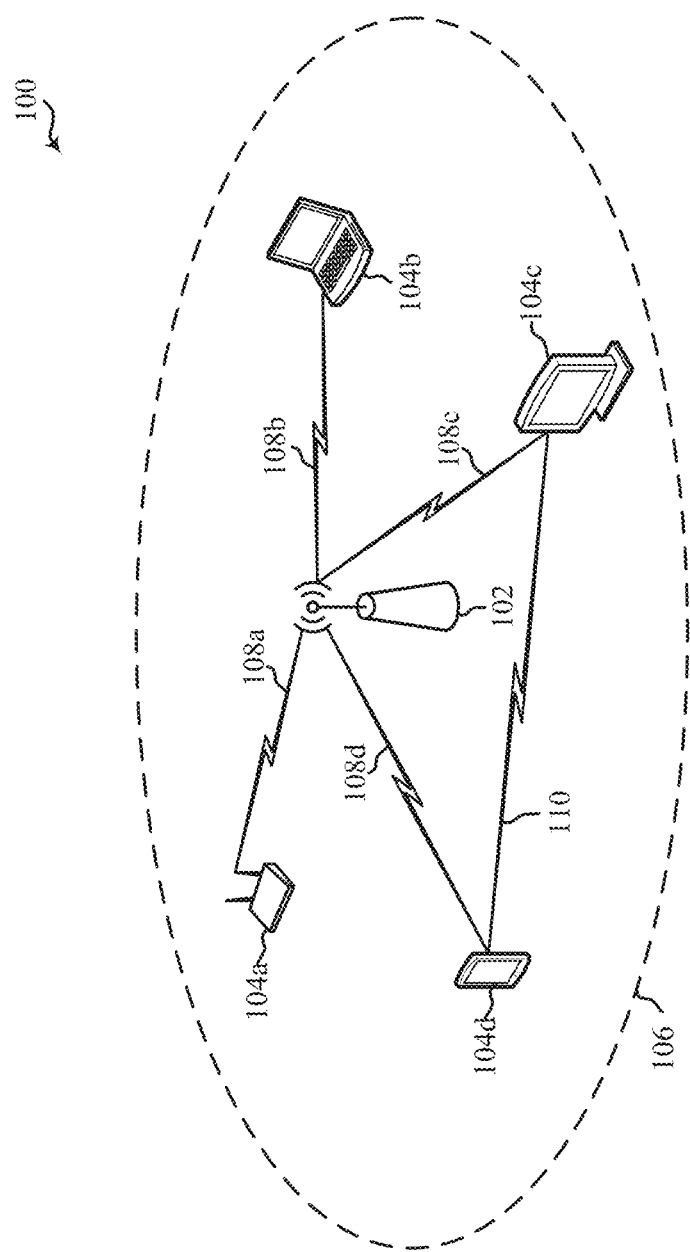
FIG. 1 is a block diagram illustrating an example wireless communication network, in accordance with some examples.

FIG. 1 is a block diagram illustrating an example wireless communication network 100. In some aspects, the wireless communication network 100 can be an example of a wireless local area network (WLAN). As used herein, a WLAN may also be referred to as a Wi-Fi network. In some examples, the WLAN 100 can be a network implementing at least one of the IEEE 802.11 family of wireless communication protocol standards (e.g., such as that defined by the IEEE 802.11-2020 specification or amendments thereof including, but not limited to, 802.11ah, 802.11ay, 802.11ax, 802.11az, 802.11ba and 802.11be). The WLAN 100 may include at least one access point (AP) 102 and multiple associated stations (STAs) 104. For example, the STAs 104 can include a first STA 104a, a second STA 104b, a third STA 104c, a fourth STA 104d, etc. While only one AP 102 is shown, the WLAN network 100 also can include multiple APs 102.

Each of the STAs 104a-104d also may be referred to as a mobile station (MS), a mobile device, a mobile handset, a wireless handset, an access terminal (AT), a user equipment (UE), a subscriber station (SS), and/or a subscriber unit, among other examples. The STAs 104 may represent various devices such as mobile phones, personal digital assistant (PDAs), other handheld devices, netbooks, notebook computers, tablet computers, laptops, display devices (e.g., TVs, computer monitors, navigation systems, etc.), music or other audio or stereo devices, remote control devices ("remotes"), printers, kitchen or other household appliances, key fobs (e.g., for passive keyless entry and start (PKES) systems), etc.

A single AP 102 and an associated set of STAs 104a-104d may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102.

The AP 102 periodically broadcasts beacon frames ("beacons") including the BSSID to enable any STAs (e.g., such as one or more, or all, of the STAs 104a-104d) within wireless range of the AP 102 to associate (or re-associate) with the AP 102 to establish a respective communication link 108a-108d (e.g., hereinafter also referred to as a "Wi-Fi link"). For example, the first STA 104a can establish a respective communication link 108a with the AP 102, the second STA 104b can establish a respective communication link 108b with the AP 102, the third STA 104c can establish a respective communication link 108c with the AP 102, the fourth STA 104d can establish a respective communication link 108d with the AP 102, etc. The STAs 104a-104d may additionally use the beacon frames broadcast by AP 102 to maintain the respective communication link 108a-108d with the AP 102. For example, the beacons can include an identification of a primary channel used by the respective AP 102 as well as a timing synchronization function for establishing or maintaining timing synchronization with the AP 102. The AP 102 may provide access to external networks to various STAs (e.g., including the STAs 104a-104d) in the WLAN via respective communication links 108 (e.g., including the respective communication links 108a-108d).

To establish the communication links 108a-108d with an AP 102, each of the respective STAs 104a-104d can perform passive or active scanning operations ("scans") on frequency channels in one or more frequency bands. For example, to perform passive scanning, each of the STAs 104a-104d listens for beacons that are transmitted by the AP 102 at a periodic time interval referred to as the target beacon transmission time (TBTT). The TBTT can be measured in time units (TUs). In some examples, one TU may be equal to 1024 microseconds (μs). In some examples, the TBTT can have a default value of 102.4 milliseconds (ms). To perform active scanning, each of the STAs 104a-104d can generate and sequentially transmit probe requests on each channel to be scanned and listens for probe responses from AP 102. Each of the STAs 104a-104d may be configured to identify or select an AP 102 with which to associate (e.g., based on the scanning information obtained through the passive or active scans), and to perform authentication and association operations to establish a respective communication link 108a-108d with the selected AP 102. The AP 102 assigns an association identifier (AID) to each of the STAs 104a-104d at the culmination of the association operations, which the AP 102 uses to track the STAs 104a-104d.

In some cases, one or more (or all) of the STAs 104a-104d may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. In some examples, one or more of the STAs 104a-104d can be covered by more than one AP 102 and can associate with different APs 102 at different times for different transmissions. After association with an AP 102, one or more of the STAs 104a-104d also may be configured to periodically scan its surroundings to find a more suitable AP 102 with which to associate. For example, a given one of the STAs 104a-104d that is moving relative to its associated AP 102 may perform a "roaming" scan to find another AP 102 having more desirable network characteristics (e.g., such as a greater received signal strength indicator (RSSI), a reduced traffic load, etc.).

In some cases, the STAs 104a-104d may form networks without APs 102 or other equipment other than the STAs 104a-104d themselves. One example of such a network is an ad hoc network (e.g., or wireless ad hoc network). Ad hoc networks may alternatively be referred to as mesh networks or peer-to-peer (P2P) networks. In some cases, ad hoc networks may be implemented within a larger wireless network (e.g., such as WLAN 100). In such implementations, while the STAs 104a-104d may be capable of communicating with each other through the AP 102 using the respective communication links 108a-108d, the STAs 104a-104d may also communicate directly with each other (e.g., with other ones of the STAs 104a-104d) using direct wireless links 110. In some examples, two STAs (e.g., of the STAs 104a-104d) may communicate via a direct communication link 110 regardless of whether both STAs 104 are associated with and served by the same AP 102. In such an ad hoc system, one or more of the STAs 104a-104d may assume the role filled by the AP 102 in a BSS. Such a STA (e.g., one or more of the STAs 104a-104d) may be referred to as a group owner (GO) and may coordinate transmissions within the ad hoc network. Examples of direct wireless links 110 can include one or more (or all) of Wi-Fi Direct connections, connections established by using a Wi-Fi Tunneled Direct Link Setup (TDLS) link, and other P2P group connections, etc.

The APs 102 and STAs 104a-104d may function and communicate (e.g., using the respective communication links 108a-108d) according to the IEEE 802.11 family of wireless communication protocol standards (e.g., such as that defined by the IEEE 802.11-2020 specification or amendments thereof including, but not limited to, 802.11ah, 802.11ay, 802.11ax, 802.11az, 802.11ba, and 802.11be). These standards define the WLAN radio and baseband protocols for the physical (PHY) and medium access control (MAC) layers. For example, the APs 102 and STAs 104a-104d transmit and receive wireless communications (e.g., hereinafter also referred to as "Wi-Fi communications") to and from one another in the form of PHY protocol data units (PPDUs) (or physical layer convergence protocol (PLCP) PDUs). The APs 102 and STAs 104a-104d in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104a-104d described herein also may communicate in other frequency bands, such as the 6 GHz band, which may support both licensed and unlicensed communications. In some examples, the APs 102 and STAs 104a-104d can communicate using sub-1 GHz unlicensed (e.g., license exempt) frequency bands, such as when implementing 802.11ah. The APs 102 and STAs 104a-104d also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11 standards and specifications may be transmitted over frequency bands that are divided into multiple 20 MHz channels. In such examples, the PPDUs are transmitted over a physical channel having a minimum bandwidth of 20 MHz, although other channel bandwidths are also possible. In some cases, a larger bandwidth channel can be formed using channel bonding, which bonds together multiple channels each of the minimum bandwidth (e.g., 20 MHz or otherwise).

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
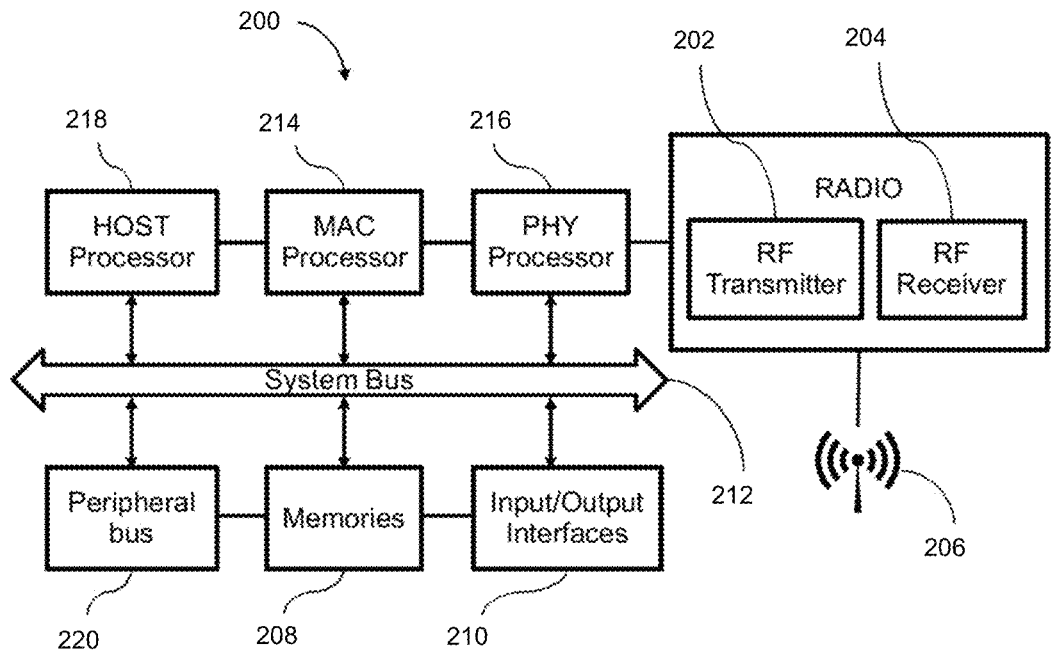
FIG. 2A is a block diagram of a Wireless Local Area Network (WLAN) device that can implement a station (STA) or access point (AP), in accordance with some examples.

FIG. 2A is a high-level block diagram of an example WLAN device 200 that can be used to implement a STA or an AP, in some examples. The example WLAN device 200 can include a MAC layer and a PHY layer in accordance with IEEE 802.11.

WLAN device 200 includes a radio frequency (RF) transmitter module 202, an RF receiver module 204, an antenna unit 206, one or more memory banks 208, input and output interfaces 210, and communication bus 212. The RF transmitter module 202 and the RF receiver module 204 are also known as a modem (modulator-demodulator device), which transmits data by modulating one or more carrier wave signals to encode digital information, as well as receives data by demodulating the signal to recreate the original digital information. As illustrated, WLAN device 200 further includes a MAC processor 214, a PHY processor 216 and a HOST processor 218. These processors can be any type of integrated circuit (IC) including a general processing unit, an application specific integrated circuit (ASIC) or RISC-V based ICs, amongst others.

The memory 208 can be used to store software and/or computer-readable instructions, including software (and/or computer-readable instructions) that can be used to implement at least some functions of the MAC layer. For example, each processor included in the WLAN device 200 (e.g., MAC processor 214, PHY processor 216, HOST processor 218, etc.) executes respective software to implement the functions of the respective communication/application layer.

The PHY processor 216 includes a transmitting signal processing unit and a receiving signal processing unit (not shown) and can be used to manage the interface with the wireless medium (WM). The PHY processor 216 operates on PPDUs by exchanging digital samples with the radio module which includes the RF transmitter 202, the RF receiver 204, analog-to-digital converters, and digital filters. The MAC processor 214 executes MAC level instructions and manages the interface between the STA application software and the WM, through the PHY processor 216. The MAC processor 214 is responsible for coordinating access to the WM so that the Access Point (AP) and STAs in range can communicate effectively. The MAC processor 214 adds header and tail bytes to units of data provided by the higher levels in the STA and sends them to the PHY layer for transmission. The reverse happens when receiving data from the PHY layer. If a frame is received in error, the MAC processor 214 manages the retransmission of the frame.

The HOST processor 218 interfaces with the MAC layer and is responsible for running higher level functionalities of the STA.

The PHY processor 216, the MAC processor 214, the HOST processor 218, the peripheral bus 220, the memories 208, and the input/output interfaces 210 communicate with each other via the peripheral bus 212. The peripheral bus 220 connects to a number of peripherals that support core functions of the WLAN device 200, including timers, interrupts, radio/filters/system registers, counters, UART, GPIO interfaces, among others. The memory 208 may further store an operating system and applications. In some examples, the memory may store recorded information about captured frames and packets. The input/output interface unit 210 allows for exchange of information with a user of the STA. The antenna unit 206 can include a single antenna and/or can include or multiple antennas. For example, multiple antennas can be used to implement Multiple Input Multiple Output (MIMO) techniques, among others.

Figure 2B:
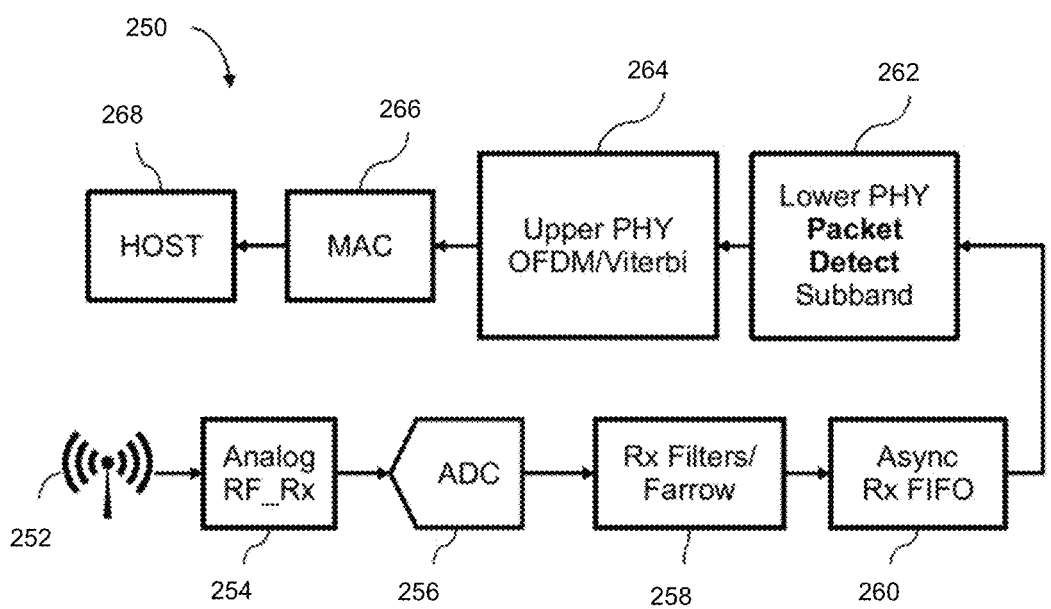
FIG. 2B is a schematic block diagram of the receiver data flow architecture of the WLAN device of FIG. 2A, in accordance with some examples.

FIG. 2B illustrates a schematic block diagram of a receiver data flow architecture 250 that can be used to receive Wi-Fi packets over the network. In one illustrative example, the receiver data flow architecture 250 illustrated in FIG. 2B can correspond to or otherwise be associated with the WLAN device 200 illustrated in FIG. 2A. In some aspects, radio signals are received over the WM and translated into electrical signals by the receiving antenna 252 (e.g., which can be the same as or similar to antenna 206). The received signal is conditioned using a series of analog filters 254 (e.g., depicted as analog RF receive (Rx) filters) before being converted into a digital signal equivalent using an analog-to-digital converter (ADC) 256. The sampled signal output of ADC 256 is conditioned again using a filter bank 258, which can include one or more digital RF filters and/or a farrow, before the samples are collected in an asynchronous receiving first-in-first-out (FIFO) data structure 260.

Samples in FIFO structure 260 can be accessed by a plurality of modules. For example, FIFO 260 can be accessed by a packet detect module and a sub-band module, both of which may be included in the lower-level PHY portion 262 depicted in FIG. 2B. In some aspects, the lower-level PHY portion 262 is itself included in the PHY processor 216 illustrated in FIG. 2A.

The packet detect module included in the lower-level PHY portion 262 can include hardware and/or implement algorithms that can be used to analyze the initial sections of the PHY protocol data unit (PPDU) in the time domain. Based on the analysis, the packet detect module can be used to recognize a received 802.11 frame and synchronize frequency and timing of the STA with the packet being received. The sub-band module included in the lower-level PHY portion 262 can include hardware and/or implement algorithms that can be used to detect which subchannel in the allocated frequency band is being used by the AP for the packet being received.

Once a packet is detected and the relevant subchannel is established, samples can be forwarded to an upper-level PHY portion 264. The upper-level PHY portion 264 (and the lower-level PHY portion 262) can be included in the PHY processor 216 illustrated in FIG. 2A. In some aspects, upper-level PHY portion 264 can be used to process and decode OFDM symbols (e.g., with the support of a coprocessor module) to reconstruct the full PPDU. The reconstructed PPDU is output by the upper-level PHY portion 264 and subsequently processed by the MAC layer processor 266. MAC layer processor 266 can be used to extract the data payload from the PPDU and provide the relevant information to the HOST layer 268 for consumption.

In some examples, the MAC layer processor 266 illustrated in FIG. 2B can be the same as or similar to the MAC processor 214 illustrated in FIG. 2A. In some cases, the HOST layer 268 illustrated in FIG. 2B can include or otherwise can be the same as or similar to the HOST processor 218 illustrated in FIG. 2A.

A WLAN (e.g., such as WLAN 100) can utilize different frame types and frame structures for performing wireless communications. For example, a Wi-Fi network can utilize management frames, control frames, and data frames. Management frames can be used to manage a BSS, control frames can be used to control access to the physical transmission medium, and data frames can be used to transmit payload data. Each Wi-Fi frame can include a Media Access Control (MAC) header, a payload, and a tailer (e.g., a frame check sequence (FCS)). In some cases, a Wi-Fi frame may be generated (e.g., transmitted, received, etc.) without including a payload. In some examples, the first two bytes of the MAC header can be indicative of a frame control field specifying the form and function of the frame. For example, the frame control field can include one or more bits indicative of the type of the associated Wi-Fi frame (e.g., management frame, control frame, data frame). In one illustrative example, the frame control field can include two bits that are indicative of the frame type of the Wi-Fi frame that includes the MAC header (e.g., which itself includes the frame control field bits). The MAC header of a Wi-Fi frame can additionally include a sequence control field. The sequence control field is a two-byte section that can be used to indicate or identify message order and/or to eliminate duplicate frames.

Management frames can be used for the maintenance, or discontinuance, of communication between an AP and a STA. For example, beacon frames are a type of management frame that contain all of the information about the Wi-Fi network (or other WLAN with which the beacon is associated). Beacon frames are transmitted periodically and have a number of functions, including the announcement of the presence of a WLAN, synchronizing the members of a service set, and signaling the presence of buffered data traffic for members of the service set.

Figure 3:
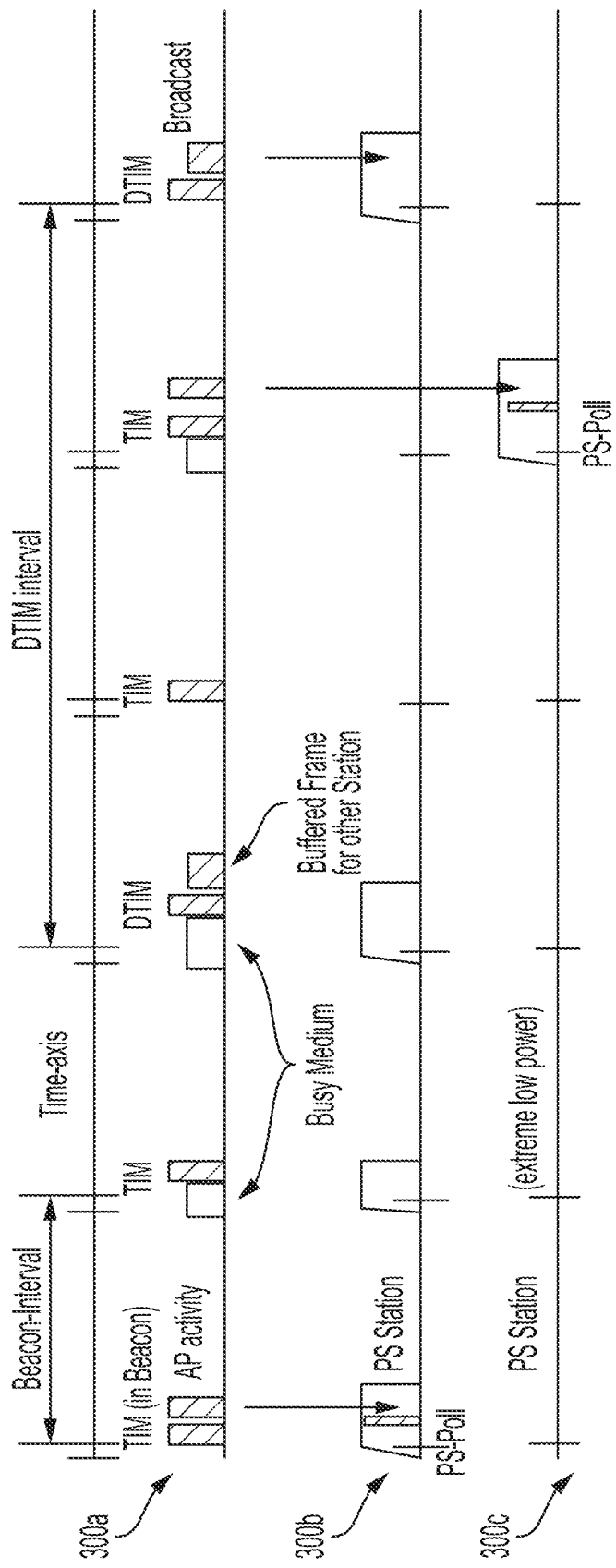
FIG. 3 is schematic block diagram of example power management operations in an IEEE 802.11 WLAN, in accordance with some examples.

FIG. 3 illustrates a set of schematic timelines depicting the transmission of beacon frames from an AP to STAs, as well as a corresponding power consumption associated with the STAs periodically receiving the beacons. The upper timeline 300a depicts activity at the AP, including beacon transmission and the buffering and transmission of various frames to the STAs. The middle timeline 300b depicts activity at a first STA, and in particular illustrates a respective power consumption at the first STA that is associated with receiving the beacons. The bottom timeline 300c depicts activity at a second STA, and in particular illustrates a respective power consumption at the second STA associated with receiving the beacons.

As mentioned previously, beacons are aimed to be sent at a target beacon transmission time (TBTT) at regular intervals. Buffered data traffic may be advertised in each beacon or at a wider interval, for example in every third beacon. Buffered data traffic may consist of group addressed traffic to multiple STAs or direct addressed traffic to specific STAs. Receiving beacons at regular intervals in 802.11 WLANs can require a significant amount of power. For example, STAs generally must wake up from a low power consumption mode/sleep-mode to receive a beacon and then determine whether the beacon indicates that buffered data traffic is available for the STA. In a majority of cases, a STA will determine that no buffered data traffic for the STA is advertised in the specific beacon (e.g., the currently received beacon), and will then return to sleep-mode. Receiving a beacon frame requires powering up all (or some) of the modules described above with reference to FIGS. 2A and/or 2B. For a TBTT of approximately 100 ms, a STA that wakes up to check for buffered data traffic at each beacon will perform 10 sleep-wake-sleep transitions per second.

In some aspects, a beacon may contain a traffic indication map (TIM) element. The AP can maintain a DTIM (Delivery TIM) count that is advertised in the TIM element of the beacon. A beacon with a DTIM count of zero is called a DTIM beacon. The TIM element will be present in a DTIM beacon and may contain a bitmap control byte that advertises whether the AP has group-addressed traffic buffered for all STAs (e.g., broadcast traffic). The TIM element may also contain a partial virtual bitmap (PVB) that indicates the presence of direct addressed traffic for individual STAs in a power save mode (TIM STAs). If group-addressed traffic (also referred to as "group traffic") is buffered at the AP, then the buffered group traffic is sent by the AP immediately after a DTIM beacon.

FIG. 3 additionally illustrates schematic power management operations of AP and STA activity, under the assumptions that a DTIM beacon is transmitted once every three beacons (e.g., the DTIM interval is three times the beacon interval, as seen in FIG. 3). In particular, the lower two timelines 300b, 300c illustrate schematic power management operations of a first and second STA. The horizontal axis in FIG. 3 is the time axis, with the top horizontal line (e.g., above timeline 300a) depicting the beacon interval shown together with a DTIM interval of three beacon intervals.

Timeline 300a depicts an example of AP activity. For instance, the AP schedules beacon frames for transmission at every beacon interval, but the beacon frames may be delayed if there is traffic at the TBTT (e.g., if there is traffic at the scheduled transmission time of a given beacon). This is indicated as "busy medium" on the AP timeline 300a. For the purposes of FIG. 3, it is noted that beacon frames contain TIMs, some of which are DTIM beacons. It is further noted that the second STA with ReceiveDTIMs equal to false (e.g., the second STA associated with the bottom timeline 300c) does not power-on its receiver for all DTIM beacons, for example because the second STA is operating in an extreme low power mode.

Timeline 300b corresponds to a first STA and timeline 300c corresponds to a second STA. Both timelines 300b, 300c depict the activity of two STAs operating with different power management requirements. Both STAs power-on their receivers when they need to listen for a TIM. This is indicated as a ramp-up of the receiver power prior to the TBTT. The TBTT can be a synchronized time between the AP and the STAs, for example based on the STAs having associated with the AP when joining the network and/or performing other time synchronization functions or operations. For example, the first STA (associated with timeline 300b), powers up its receiver and receives a TIM in the first beacon frame; that TIM indicates the presence of buffered broadcast data for the receiving STA. The receiving STA then generates a PS-Poll or trigger frame, which elicits the transmission of the buffered broadcast data from the AP (e.g., in response to the AP receiving the PS-Poll or trigger frame transmitted by the first STA) Non-GCR-SP group addressed broadcast data are sent by the AP subsequent to the transmission of a beacon frame containing a DTIM.

As mentioned previously, the DTIM is indicated by the DTIM count field of the TIM element having a value of zero. As shown in FIG. 3, TIM STAs typically wake to receive DTIM beacons to parse the TIM element to see if the AP has either buffered group traffic and/or buffered direct traffic for the STA. Notably, if the TIM element is empty then the power used by the STA to wake up and then go back to sleep can be considered as 'wasted power'.

Accordingly, there is a need to reduce the power consumption associated with a STA receiving beacons in WLANs of all types. There is a further need to reduce the power consumption associated with a STA receiving beacons in WLANs that operate in the sub-1 GHz frequency band, such as 802.11ah WLANs (e.g., recalling that 802.11ah beacon frames may be extended in length/airtime duration compared to other 802.11 beacons and/or may be associated with STAs that are relatively low-complexity and/or low-power devices).

Systems, apparatuses, processes (also referred to as methods), and computer-readable media (collectively referred to as "systems and techniques") are described herein for improved power efficiency beacon signaling in a WLAN. In one illustrative example, the systems and techniques can be used to provide improved power efficiency beacon signaling in a sub-1 GHz WLAN, such as an 802.11ah Wi-Fi network. For example, the systems and techniques can improve the power efficiency associated with beacon frame transmission by indicating to STAs whether a DTIM beacon has buffered traffic ahead of time, such that a STA can determine whether to receive the DTIM beacon (e.g., if buffered traffic for the STA will be available) or return to sleep immediately and skip receiving the DTIM beacon (e.g., thereby reducing power consumption and increasing power efficiency at the STA).

Figure 4:
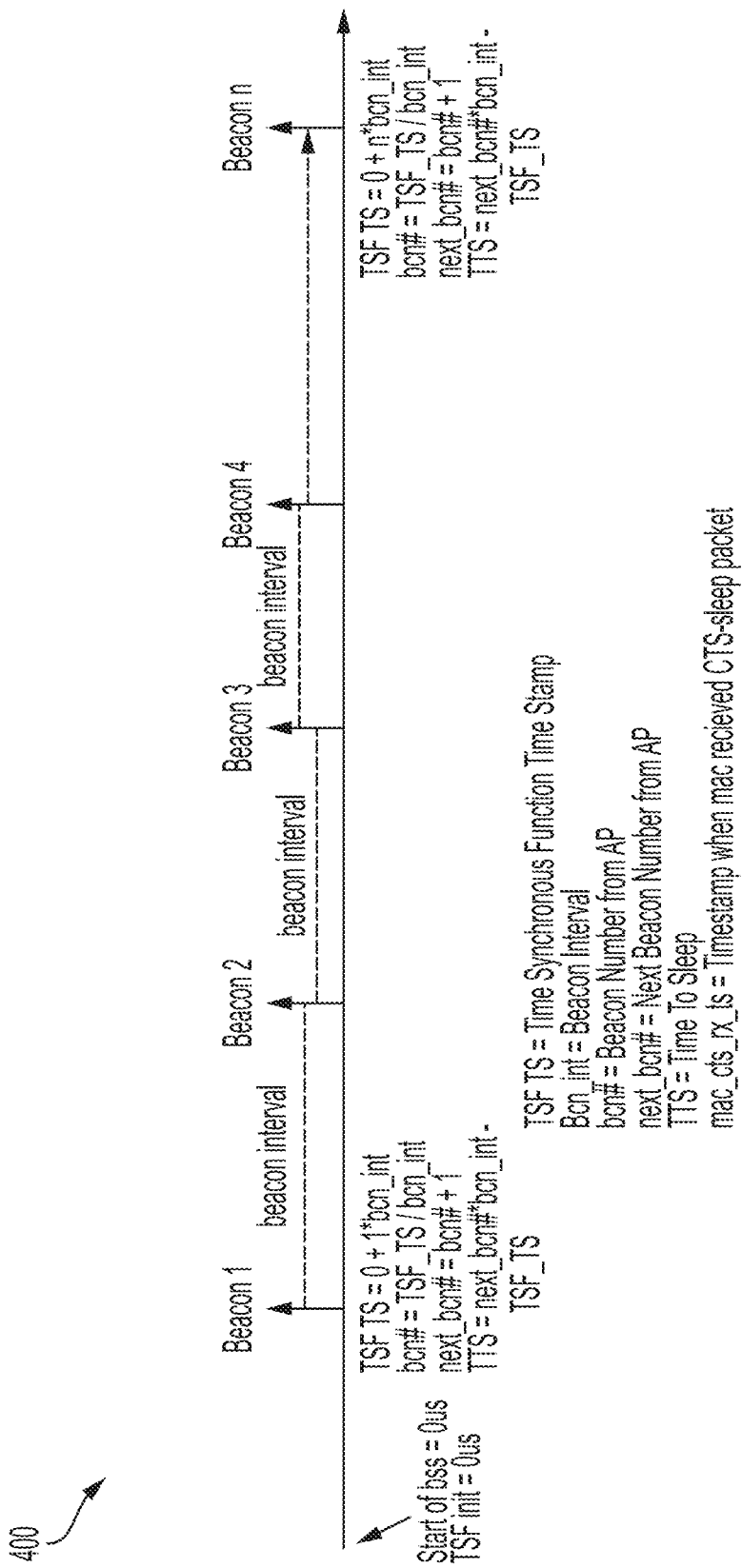
FIG. 4 is a schematic diagram of an STA reception timeline when a beacon frame arrives on-time, in accordance with some examples.

FIG. 4 shows a schematic diagram of an STA reception timeline when a beacon frame arrives on-time. As illustrated, the STA receives a plurality of beacons (e.g., Beacon 1, Beacon 2, . . . , Beacon n) each separated by a beacon interval. In some embodiments, the beacon interval between successive beacons can be determined based on the TBTT, as mentioned previously. As illustrated, the plurality of beacons 1-n can be associated with the same BSS. The beacons may additionally be associated with the same time synchronization function (TSF) time stamp (TS), indicated in FIG. 4 as 'TSF TS.'

At the beginning of the illustrated STA reception timeline of FIG. 4 (e.g., the far left of the timeline, prior to Beacon 1), a BSS start time and a TSF initial time can be equal to zero. For example, start of BSS=0 µs and TSF init=0 µs.

The TSF timestamp associated with receiving the nth beacon can be determined as $TSF\_TS_n = 0 + n*beacon_{int}$. That is, when the beacons arrive on-time to the STA, each beacon is received at some multiple of the beacon interval (plus the TSF initial timestamp value, which in this example is zero). The beacon number of a given beacon received at the STA can be determined by dividing the corresponding TSF timestamp by the beacon interval, e.g., beacon $\#=TSF\_TS_n/beacon_{int}$. The next beacon number can be determined by incrementing the current beacon number by one, e.g., next_ beacon #=beacon #+.

In some examples, the STA can determine a Time to Sleep (TTS) indicative of when the STA should next power-up or otherwise exit a low-power/sleep mode in order to receive the next beacon. For example, when Beacon 1 is received at $TSF\_TS_1$, the TTS can be determined as $TTS=next\_beacon \#*beacon_{int}-TSF\_TS_1$.

Figure 5:
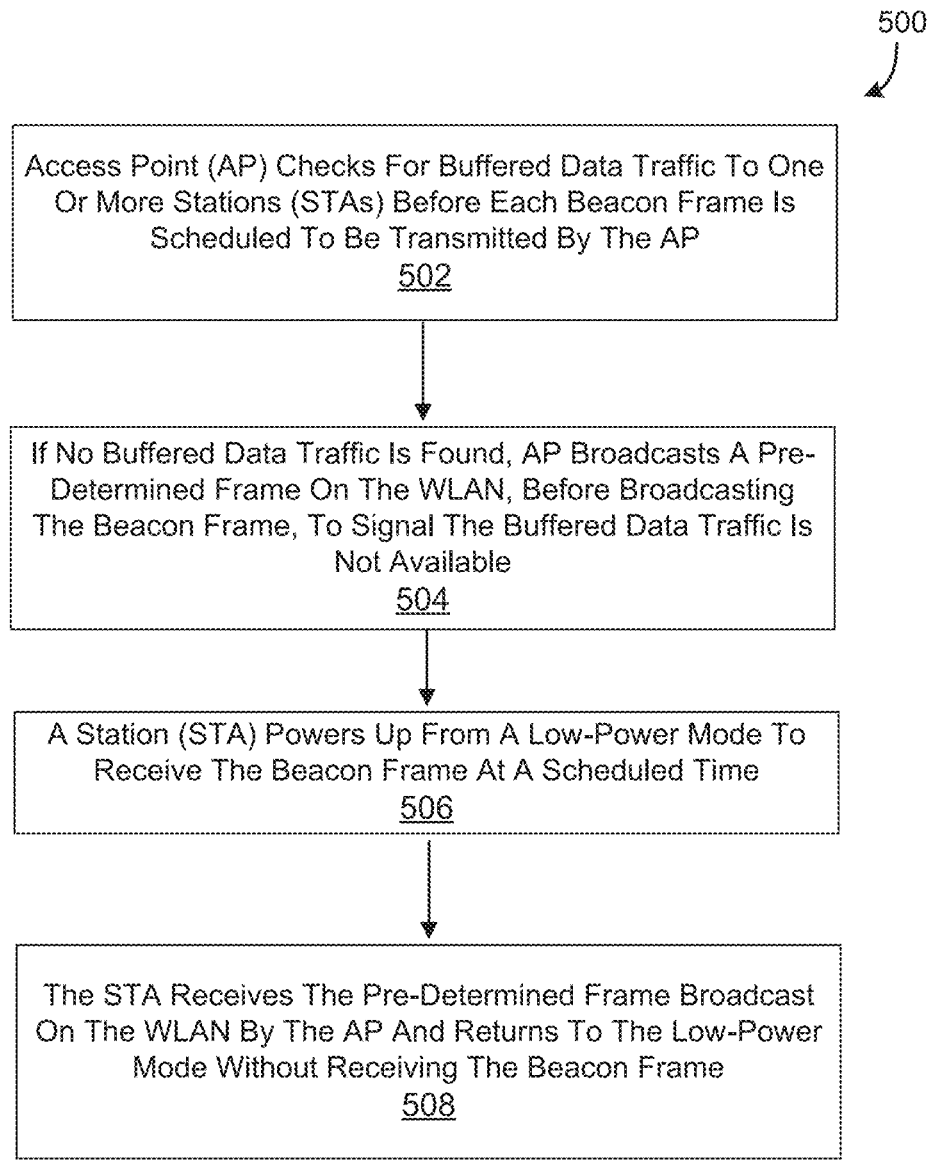
FIG. 5 is a flow diagram of a beacon signaling method that allows for power savings across the network, in accordance with some examples.

FIG. 5 shows an example flow diagram of a signaling process 500 that can be used to provide power savings across a network. For example, the process 500 provides improved power efficiency beacon signaling on a WLAN, as will be explained in greater depth below.

In step 502, an access point (AP) checks for buffered data traffic to one or more stations (STAs). The buffered data traffic can be group-addressed traffic to a plurality of STAs associated with the AP (e.g., in the same BSS, etc.). In some cases, the buffered data traffic can additionally, or alternatively, include direct traffic associated with a particular STA.

In one illustrative example, the AP can check for the buffered data traffic before each beacon frame is due to be sent by the AP. For example, with reference to FIG. 4, the AP can check for buffered traffic before each of the n beacon frames are scheduled for transmission. In other words, the AP can check for buffered data traffic during the beacon interval, before the TBTT associated with each beacon frame transmission or broadcast by the AP. In some embodiments, the AP can check for buffered group-addressed data traffic before each DTIM beacon is due to be broadcast by the AP (e.g., recalling that in some cases, group-addressed data traffic is only transmitted after a DTIM beacon, which can be transmitted every third beacon and/or with a periodicity different than the beacon interval as illustrated in FIG. 3). For example, to check for buffered group-addressed data traffic before broadcasting an upcoming DTIM beacon, the AP may check a bitmap control byte of the TIM element included in the upcoming DTIM beacon. The AP may check a partial virtual bitmap (PVB) in the TIM element included in the upcoming DTIM beacon, or the AP can check both the bitmap control bytes and the PVB in the upcoming DTIM beacon.

In step 504, if no buffered data traffic is found (e.g., based on the check performed by the AP in step 502), the AP can broadcast a pre-determined frame on the WLAN to signal the presence of buffered data traffic before broadcasting the upcoming beacon frame on the WLAN. In some embodiments, the pre-determined frame is a null data packet (NDP) frame. For example, the NDP frame is one or a combination of a clear to send (CTS) frame, a NDP paging frame, and/or a CTS-to-self frame. In some embodiments, the pre-determined frame is a beacon frame itself. In an illustrative example, the pre-determined frame can be a CTS-to-self frame with duration=0. In some examples, a duration field value of the pre-determined frame can be set to a value between 1 and 127 to signal the presence of buffered data traffic. Various other frames can additionally, or alternatively, be utilized as the pre-determined frame without departing from the scope of the present disclosure. For example, in some embodiments, the pre-determined frame may be an NDP Paging frame that is sent unsolicited by the AP (e.g., to one or more STAs) ahead of a beacon to indicate that no traffic is buffered for the one or more STAs, to indicate that traffic is buffered for the broadcast address only (e.g., group-addressed traffic only), or to indicate that traffic is buffered for a particular group address, etc. In some embodiments, an NDP paging frame can be used as the pre-determined frame, instead of a CTS-to-self frame, as the use of the NDP paging frame can allow the AP to signal that direct addressed traffic is available for a small number of video cameras, for example, as well as the availability of group addressed traffic. Additionally, when using the NDP paging frame as the pre-determined frame, STAs not supporting the presently disclosed use of the NDP paging frame may be unlikely (or less likely) to misinterpret the NDP paging frame. In some embodiments, the pre-determined frame can include one or more of an NDP CTS or NDP CF-End, an NDP PS-Poll, an NDP Ack, an NDP PS-Poll-Ack, and NDP BlockAck, and NDP Beamforming Report Poll, and NDP Paging, and/or an NDP Probe Request. In an embodiment, a signal field of the beacon frame can be configured to signal the presence of buffered data traffic rather than using a separate NDP frame (or other pre-determined frame, as described above) to signal the presence of buffered data traffic.

In step 506, the STA can power up from a low power/sleep mode to receive the pre-determined frame or the beacon frame at respective, corresponding times. The pre-determined frame can be pre-determined at both the AP and the STAs in the network/the STAs associated with the AP. Based on the pre-determined frame being known to both the AP and the STAs, the receipt of the pre-determined frame at any given one of the STAs can be indicative of no buffered data traffic being available for the given STA. For example, STAs in the network can be configured such that the pre-determined frame is interpreted by specific STAs (e.g., STAs implementing the presently disclosed systems and techniques) as a 'no traffic available' indication that sends these STAs back to 'low-power' mode (e.g., triggers the STAs to return to low-power/sleep mode) without receiving the upcoming beacon frame. The improved power efficiency beacon signaling described herein can be implemented in WLANs, Wi-Fi networks, etc., that include both STAs implementing the presently disclosed systems and techniques and STAs that do not implement the presently disclosed systems and techniques. For instance, STAs that do not implement the presently disclosed systems and techniques can receive the pre-determined frame and disregard it and may continue to operate normally.

In other words, based on receiving the pre-determined frame, the STAs can return to the low-power mode in step 508 based on being made aware that they do not need to receive the full WLAN beacon frame that will follow the pre-determined frame (e.g., the next/upcoming beacon referred to in step 502), because receiving the pre-determined frame indicates that the upcoming beacon will not advertise any data traffic for the STAs. In some aspects, the power consumption associated with a STA receiving a pre-determined frame, such as a CTS or CTS-to-self frame, may be significantly less than the power consumption associated with the STA receiving the full WLAN beacon frame. For example, a CTS-to-self frame may be approximately four times shorter than a full WLAN beacon frame, and power consumption at the stay in receiving these respective frames scales linearly. Accordingly, the systems and techniques described herein can improve the power efficiency of beacon signaling by allowing STAs to return to low power/sleep mode without having to receive and/or decode full WLAN beacons that do not contain any buffered data traffic for the STAs. In some cases, the STAs may additionally skip the Time Synchronization Function (TSF) update or synchronization that would otherwise be performed based on receiving the upcoming full WLAN beacon. For example, instead of performing TSF synchronization, the STAs can calculate the next TBTT from previously cached data and return to sleep until the next TBTT.

In some embodiments, the duration parameter of the pre-determined frame (e.g., 0<duration<160 µs) can be used to signal or otherwise indicate one or more other network conditions and/or configurations to the STAs. For example, one or more particular values (or value ranges) of the duration parameter can be used to signal or indicate that buffered data traffic is only available for a particular STA or for a particular subset of STAs. In such examples, the particular values or value ranges can be pre-determined for or by the WLAN (e.g., based on configuration information of the WLAN, etc.), such that the STAs receiving the pre-determined frame with different duration parameter values are able to correctly interpret the information indicated by the duration parameter. In some embodiments, group and/or individual MAC addresses can be mapped to particular duration values and/or ranges of duration parameter values, such that the duration parameter value can be parsed by the STAs to determine whether buffered data traffic is available for a given STA (or group of STAs to which the given STA belongs). In some embodiments, the duration field (e.g., duration parameter value) of the pre-determined frame can be utilized as a bit field, wherein a first bit is used to signal or indicate group buffered traffic for the STAs and one or more additional bits (e.g., different from the first bit) are used to signal or indicate individual buffered traffic for particular STAs (or smaller groups or subsets of STAs). In one illustrative example, when the duration parameter is used to signal or indicate that buffered data traffic is only available for a particular STA (or a particular subset of STAs), the remaining STAs can ignore the corresponding beacon frame based on parsing the duration parameter value of the corresponding pre-determined frame. In some examples, the duration parameter can be determined as: duration=short interframe spacing (SIFS) time+beacon Tx time. Such a determination of the duration parameters can be used to also cover the beacon transmission in terms of virtual carrier sense in other STAs but could be confused with normal signaling (e.g., could be confused with normal signaling by other STAs that are not configured to parse the duration field as indicative of the supplementary information described above, but instead attempt to parse the duration field as indicative of duration).

As noted previously, STAs which are not configured to comply with or otherwise implement the 'low-power' beacon signaling protocol described herein will not understand the CTS frame (or other pre-determined frame). These STAs may decode the CTS or other pre-determined frame broadcast by the AP but may subsequently ignore the frame and remain awake (e.g., powered-on) waiting for the upcoming/following beacon frame. Advantageously, the use of a pre-determined frame that does not trigger any action on the part of conventional/non-participating STAs allows the intermingled use or deployment on the same WLAN of STAs that operate with the presently disclosed improved power efficiency beacon signaling method and STAs that do not.

If the AP does not broadcast a pre-determined frame (e.g., does not broadcast the CTS Frame), for example because the upcoming beacon does advertise buffered data traffic for the STA(s), or if the STA misses the pre-determined frame, the STA will remain awake and powered-on to receive and parse the full beacon frame as normal. In cases when a beacon frame is received in error, the STA continues to be awake until the next DTIM beacon frame to allow TSF synchronization.

Because the pre-determined frame may be much shorter than the beacon frame (e.g., a CTS frame may be approximately four times shorter than a beacon frame), the signaling method disclosed herein can provide power savings and/or improved power efficiency based on the STAs staying awake for a much shorter period of time required to parse and decode the pre-determined frame, as compared to the longer period of time required to parse and decode the full beacon frame. For example, for 802.11ah WLANs using 1 MHz channel and DTIM=3, the systems and techniques disclosed herein using a CTS-to-self frame to indicate whether there is buffered traffic at the AP can be seen to achieve power consumption reductions at the STA from approximately 1.2 mW to 0.6 mW.

In some embodiments, depending on the network requirements, the AP may send the pre-determined frame at the target beacon transmission time (TBTT) or ahead of (e.g., before) the TBTT by a period of time required to transmit the pre-determined frame plus a time offset. For example, if the AP sends the pre-determined frame at the TBTT, the pre-determined frame is sent at the time in which a beacon frame would normally be transmitted. If the AP sends the pre-determined frame before the TBTT, in some embodiments, the AP may transmit the pre-determined frame at (TBTT—time required to transmit the pre-determined (e.g., CTS) frame–time offset). In some examples, the time offset can be equal to the short inter-frame space (SIFS) time. SIFS is the time interval required by a wireless device in between receiving a frame and responding to the frame. The SIFS time can be specified by the WLAN or network type. For example, an 802.11ah WLAN utilizes a fixed SIFS time. It is used in the distributed coordination function (DCF) scheme, which is a mandatory technique used to prevent collisions.

In the first instance, STAs on the network that are not configured to decode the pre-determined frame as a trigger or indication to return to the low-power mode (e.g., STAs not implementing the disclosed systems and techniques), will remain powered up until the actual beacon is received (e.g., at a delayed time relative to the TBTT, because in the first instance the pre-determined frame is transmitted at the TBTT and the beacon is delayed from the TBTT).

In the second instance, the STAs that implement the disclosed low-power signaling method will power-up a pre-determined period of time before the TBTT, for example the time taken to transmit the pre-determined frame plus SIFS. For example, in the case of an IEEE 802.11ah WLAN, this time is about 720 µs for a 1 MHz subchannel and 400 µs for a 2 MHz subchannel, although it is noted that other periods of time can be utilized based on network configuration without departing from the scope of the present disclosure. In some examples, the pre-determined period of time before the TBTT at which a STA wakes up or powers-on to receive the CTS frame or other pre-determined frame can be programmable by firmware.

In some embodiments, when a CTS-to-Self frame is utilized as the pre-determined frame indicative of no buffered data traffic for one or more STAs, a STA receiving the CTS-to-Self frame may be unable to obtain timing synchronization information as the STA would if a beacon frame were to be received. For instance, there is no timing synchronization function (TSF) information on a CTS-to-self frame. If STAs continue to or repeatedly receive CTS-to-self frames and return to low-power mode rather than receiving the beacon frames, the timer of STA may desynchronize from the AP timer. Accordingly, in some embodiments the systems and techniques disclosed herein can use a timeout period that is set for low-power mode based on the pre-determined frame (e.g., such as CTS-to-self). The timeout period can be pre-determined and/or configured in firmware.

In one illustrative example, if an STA has been in low-power mode for longer than the timeout period, the STA is forced to power up for the next beacon frame, receive it and parse it to resynchronize with the AP timer. In other words, if a STA has not decoded a beacon frame for more than the timeout period, then the CTS-to-self sleep times out and the STA will wait to receive the next beacon frame, synchronize with the timer of the AP, and only after completing time synchronization returns to low power mode. After this, the STA can continue to receive CTS-to-s elf frames and remain in the low-power mode, until either the STA does not receive a CTS-to-s elf frame at the expected time (in which case the STA remains awake to receive the following beacon frame) or until the STA again exceeds the timeout period (in which case the STA remains awake to receive the following beacon frame and process the beacon frame to perform time synchronization). For example, the timeout period can be set to 60 seconds, in which case the CTS-to-self sleep times out if the STA has not seen (e.g., received) a beacon frame for more than 60 seconds. When the CTS-to-self sleep times out after the 60-second timeout period the STA then waits to receive a beacon frame, synchronize its TSF timer with that of the AP, and go back to sleep. In some embodiments, an implementation of the timeout period can be modified such that the STA measures a relative clock drift between its TSF timer and the AP TSF timer, with the STA subsequently adjusting the timeout accordingly (e.g., based on the measured relative clock drift).

In some embodiments, the timeout period can additionally, or alternatively, be implemented by the AP. For example, a timeout period can be implemented by an AP, can be implemented by a STA, or can be implemented by the AP and the STA. In some examples, a timeout period implemented by the AP can be the same as or similar to the timeout period implemented by the STA, as described above. For instance, a timeout period implemented using an AP can track or otherwise determine the elapsed time since the AP has last broadcast a beacon frame to one or more STAs (e.g., wherein the AP has been continuously broadcasting the presently disclosed pre-determined frames subsequent to its last broadcast of a beacon frame). Based on the AP implementing a timeout period that tracks the elapsed time since the AP last broadcast a beacon frame, the AP can use its internally tracked timeout period to determine or otherwise estimate the elapsed time since a STA has last received a beacon (e.g., and performed time synchronization with the AP, based on the STA receiving the beacon). Accordingly, when the AP determines that its timeout period has been exceeded, the AP can skip broadcasting a pre-determined frame to force all STAs receiving a subsequent beacon frame. By broadcasting the beacon frame to the STAs, in response to the AP-implemented timeout period being exceeded, the AP can cause the STAs receiving the beacon frame to resynchronize with the AP (based on the STAs using the received beacon frame to perform time synchronization, as noted above).

Figure 6:
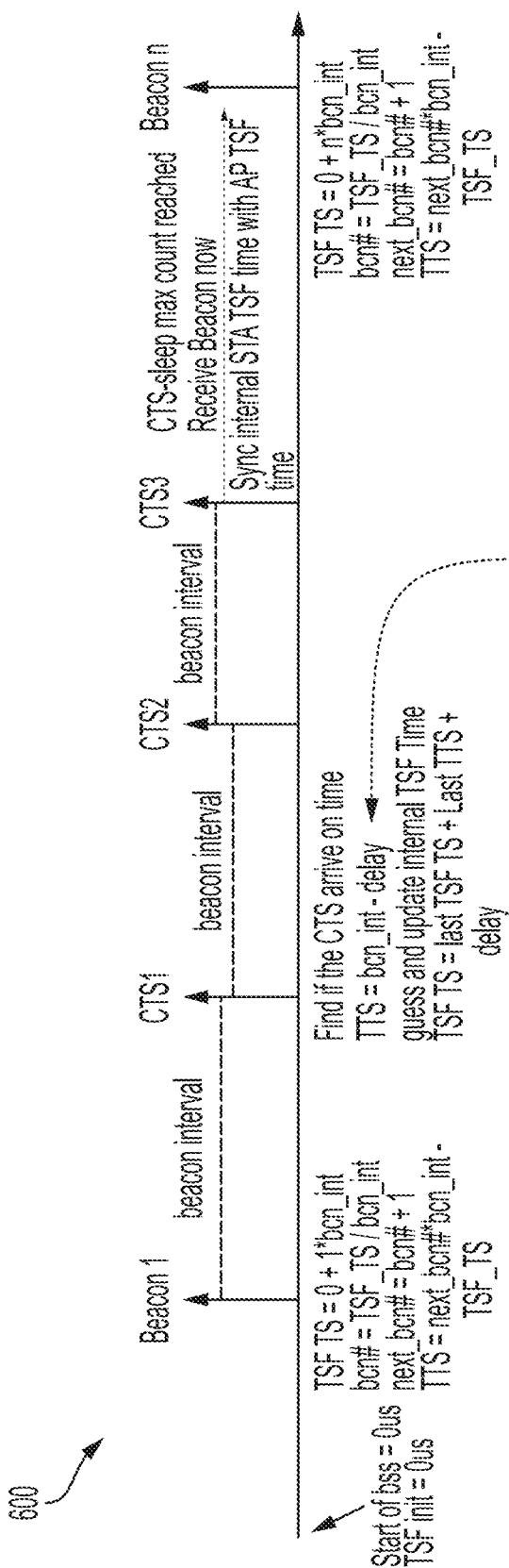
FIG. 6 is a schematic diagram of an STA reception timeline when a null data packet (NDP) clear to send (CTS)-to-self (CTS-Self) arrives on time, in accordance with some examples.
Figure 7:
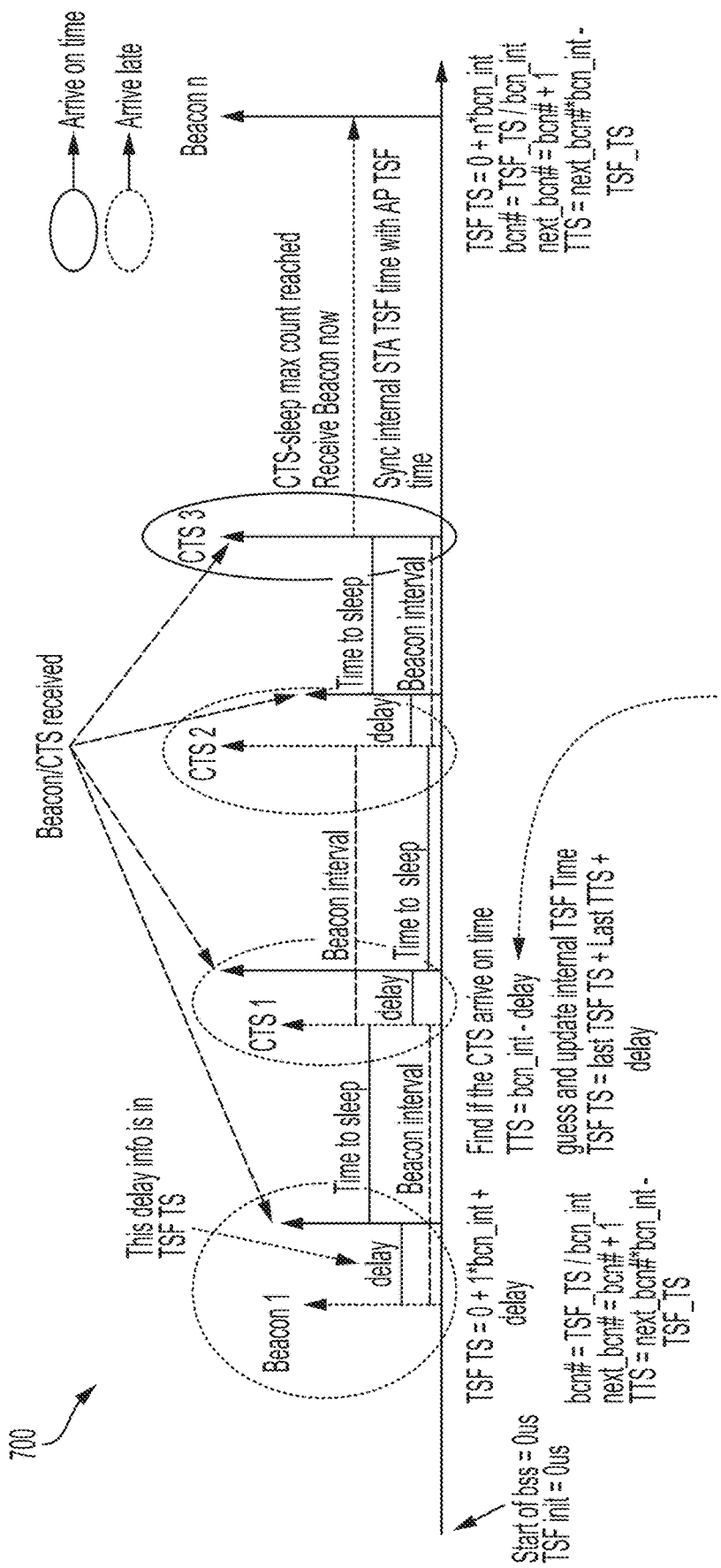
FIG. 7 is a schematic diagram of an STA reception timeline when an NDP CTS-to-self (NDP) and the beacon arrive late due to busy medium, in accordance with some examples.

FIG. 6 shows a schematic diagram of an STA reception timeline when a CTS-to-self frame (e.g., the pre-determined frame) arrives on time. FIG. 7 is similar to FIG. 6, but instead shows a schematic diagram of an STA reception timeline when a CTS-to-self frame (e.g., the pre-determined Frame) arrives late or otherwise with a delay. For example, a CTS-to-self frame may arrive late/with a delay due to a busy medium (e.g., the WM between the AP and STAs).

The STA reception timelines of FIG. 6 and/or FIG. 7 can be similar to the STA reception timeline of FIG. 4, with the difference being that a beacon is received at every beacon interval/TBTT in FIG. 4 while beacon reception is skipped in FIG. 6 and/or FIG. 7 based on the STA receiving the pre-determined CTS-to-s elf frame (e.g., pre-determined frame). For example, in each of FIGS. 4, 6, and 7, the STA first receives Beacon 1 at the first TBTT. However, as illustrated in FIGS. 6 and 7, following the beacon interval after receiving Beacon 1, the STA wakes up and receives a first CTS frame, CTS1. Based on receiving CTS1, the STA may determine that no buffered data traffic will be contained in the corresponding beacon frame and the STA returns to sleep mode without receiving Beacon 2 (e.g., the Beacon 2 depicted in FIG. 4 at the same TBTT). Similarly, based on receiving CTS2 at the next TBTT, the STA returns to sleep mode without receiving the corresponding Beacon 3 (e.g., the Beacon 3 depicted in FIG. 4 at the same TBTT), . . . , etc.

As illustrated, the STA may determine after receiving CTS3 that the aforementioned timeout period has been reached or exceeded (e.g., indicated as 'CTS-sleep max count reached' in FIGS. 6 and 7). Because the timeout period has been exceeded, the STA is configured to remain powered-on to receive the next beacon, even though receiving CTS3 would otherwise have caused the STA to return to sleep mode without receiving the next beacon. Based on receiving the next beacon (e.g., immediately or shortly following receiving CTS3), the STA can use the received beacon frame to synchronize its internal STA TSF time with the AP TSF time (e.g., based on AP TSF time information indicated by the received beacon frame).

When the STA receives a CTS (or other pre-determined frame) rather than the beacon, the STA can perform a time estimation to update the internal STA TSF time. For example, after receiving each CTS frame, the STA can update its STA TSF time as $TSF\_TS_t = TSF\_TS_{t-1} + TTS_{t-1}$. In other words, the STA updates its STA TSF timestamp at time t as the STA TSF timestamp from time t−1 plus the TTS between the two timestamps.

In some embodiments, TBTT can be evaluated from TSF information included in or otherwise indicated by the received beacon(s). For example, delay information can be determined from the TSF TS associated with receiving a beacon frame and/or receiving a CTS (or other pre-determined) frame. In some examples, time to sleep (TTS) information can also be obtained, at the STAs, based on the TSF information and/or other information included in the received beacon(s). Beacons are generally on the wireless medium (WM) at TBTT. In some instances, for example when the WM is busy, beacons can be slightly late and get on the WM after TBTT.

For pre-determined frames, such as CTS-to-self frames, going on the WM at TBTT, the time to sleep for STAs in one embodiment is equal to the beacon interval multiplied by the DTIM period. For example, if every third beacon transmitted by an AP is a DTIM beacon, the DTIM period is equal to three, and the TTS is 3*beacon interval (e.g., the TTS is equal to the amount of time between successive DTIMs). However, if the pre-determined frames, such as CTS-to-self frames get on the WM later than TBTT, because STAs calculate the TTS as the beacon interval multiplied by the DTIM period (e.g., because STAs calculate the TTS as an integer multiple of the beacon interval), STAs may remain in low-power mode for too long and miss the next CTS-to-self or beacon frame.

As mentioned previously, it can be difficult to evaluate the TTS from CTS-to-self frames as they do not have information about TSF. However, delay information can be determined from a beacon's TSF timestamp information and subsequently, this delay offset can be used to evaluate TTS for STAs receiving CTS-Self. In one illustrative example, STAs can use the algorithm below to evaluate the TBTT and TTS based on or using the CTS-to-self frame.

The instances covered by the algorithm are schematically shown in FIGS. 4, 6, and 7. The algorithm assumes the STAs that are using the presently disclosed low power signaling mode require a fixed time to boot up/power on (e.g., a fixed time to transition from sleep mode to being fully booted with the STA's radio on and ready to receive). For example, a STA may take 1,500 µs or less from exiting sleep mode to beginning MAC processing for receiving a CTS frame.

The STAs assume that when the CTS-to-self or beacon frame arrives on time, then the corresponding PHY Rx timestamp of the frame cannot exceed a given threshold time (Th). In one illustrative example, the threshold time Th can be the same as the fixed time required for the STA to boot up. For example, the threshold time Th can be equal to 1,500 µs. In such an example, if MAC_CTS_Rx_ts represents the timestamp (in µs) at which the STA began receiving/MAC processing of a CTS-to-self frame (with MAC_CTS_Rx_ts=0 representing the moment the STA began exiting sleep mode), then if MAC_CTS_Rx_ts<1500 the STA can determine that the CTS-to-self frame arrived in time with delay=0.

For example, if the PHY Rx timestamp of a received CTS-to-self frame is less than the threshold time Th, then the STAs expect (e.g., assume) a beacon frame arriving at TBTT with zero delay and a TTS given by:

$$TTS = (\text{beacon interval} \times \text{DTIM period}) - 0 \qquad \text{Eq. (1)}$$

However, if the PHY Rx timestamp of the received CTS-to-self frame exceeds the threshold time Th, then the STAs expect (e.g., assume) a delayed beacon frame arriving after TBTT with the delay and corresponding TTS being:

$$\text{delay} = \text{PHY } Rx \text{ Timestamp} - Th \qquad \text{Eq. (2)}$$

$$TTS = (\text{beacon interval} * \text{DTIM period}) - \text{delay} \qquad \text{Eq. (3)}$$

For instance, continuing in the example above, if MAC_CTS_Rx_ts>1500 (or if (MAC_CTS_Rx_ts<1500) evaluates to false), the STA may determine that the CTS-to-self frame arrived late with delay=MAC_CTS_Rx_ts−1500.

As illustrated in FIG. 6, after receiving each CTS-to-self frame (or other pre-determined frame), the STA can determine if the CTS-to-self frame arrived on time (e.g., based on the threshold time Th described above). The STA can subsequently determine the appropriate TTS, based on whether or not the CTS-to-self frame arrived on time or with a delay.

In some embodiments, the STAs also make assumptions and update their internal STA TSF timestamp on the reception of every CTS-to-self frame (e.g., in addition to updating/synchronizing the STA TSF timestamp when receiving a beacon frame). The internal STA TSF timestamp update process can be used to maintain timing information at the STA, because (in some examples) each time the low power mode is entered by the STA, the timer restarts and the STA loses synchronization. In some examples, synchronization can be maintained, either wholly or partially, by storing or otherwise saving the TSF timer value (e.g., the TSF timestamp referenced above) prior to the STA entering the low power mode. Subsequently, when the STA wakes (e.g., exits the low power mode), the STA can restore the TSF timer value by updating the saved TSF timer value with an elapsed time measurement or estimation. For example, the elapsed time measurement or estimation can correspond to an elapsed time between the STA entering the low power mode and subsequently exiting the low power mode (e.g., the time between saving the TSF timer value and the later time at which the STA exits the low power mode). Hence, the TSF can be important for periodic time calibration at the STA. In one illustrative example, the TSF of STA can be updated upon the reception of CTS-SELF frame as follows:

$$\text{New TSF Timestamp} = \text{Last TSF Timestamp} + \text{Last TTS} + \text{Delay} \qquad \text{Eq. (4)}$$

In an embodiment, a TSF timer value is saved by the STA before entering the low power mode and the TSF timer value is restored on exiting the low power mode according to an elapsed time. The elapsed time indicates a period of time since the STA last received or decoded a beacon frame broadcast from the AP, and calculation of the elapsed time may require storing of rate ratio between the system clock and the always-on block timer. The STA exits the low power mode to receive an incoming beacon frame when the elapsed time is greater than or equal to the timeout period.

As noted previously, in some embodiments, the pre-determined frame utilized by the systems and techniques described herein can be an NDP paging frame. The NDP paging frame can be used to signal the presence and/or absence of buffered data traffic at the AP. In some cases, one or more subfields of the NDP paging frame can be set as follows. Bits 3-11 in a P-ID subfield can be set to zeros in order to indicate that neither group addressed traffic nor direct addressed traffic is buffered at the AP. Bit 3 set to one indicates that group traffic is buffered at the AP. Bits 4-11 indicate a bitmap representing Association IDs (AIDs) 1-8, wherein setting any of these bits 4-11 to one indicates the presence of buffered traffic for a particular STA (or group/subset of STAs) mapped to that AID. Bits 12-20 in the APDI/partial AID subfield are set to the AP's partial BSSID. Bit 21 in the Direction subfield is set to zero so that the APDI/partial AID subfield is not interpreted as a partial timestamp. Bit 22 in the Reserved Bits subfield is set to one to indicate that the NDP paging frame is a TIM indication frame rather an a normal NDP paging frame. Bits 23 onwards may be used to represent the presence of buffered traffic for more AIDs.

In another embodiment of the pre-determined frame, the beacon frame itself in a future 802.11 MAC/PHY specification could be used to signal or indicate the presence of buffered data traffic. For example, a signal (SIG) field in the beacon frame can be configured to signal or indicate whether buffered data traffic is advertised in the beacon frame. For example, one or more subfields of the beacon frame signal field can be configured as follows. A one-bit subfield can be used to indicate that the signal field is that of a beacon packet, rather than any other kind of packet. A subfield can be used to identify a sender of the beacon frame with reasonable probability, for example, a partial BSSID field. A subfield can be used to indicate the presence of group addressed and possibly other traffic for a small number of STAs. Using the 802.11ah short preamble PPDU format as an example, the signal field (SIG) after the training fields occupies two symbols. Bit 0 in the SIG field is a reserved field set to 1 in the current 802.11ah specification, which can indicate that buffered data traffic is not available, according to an embodiment. By contrast, setting bit 0 in the SIG field to 0 can be used to signal that the Data field contains a beacon, which indicates the buffered data traffic is available. In some embodiments, various other subfields in the signal field can be repurposed to indicate the presence of buffered data traffic at the AP. A power save STA then only needs to decode the signal field in the beacon frame to determine if the STA should immediately go back to sleep or stay awake to receive the entire beacon frame.

In one aspect of the present disclosure, the indication of the presence of buffered data traffic using a pre-determined frame can be enabled or disabled on both the AP and STA sides. For example, once the feature is enabled (e.g., when the use of a pre-determined frame to indicate the presence of buffered data traffic is enabled), an AP can add a vendor specific element to probe responses and association responses which indicates to associating STAs that the feature is available and in use. In some embodiments, the BSS is started with the feature enabled. Once the feature is enabled on the STA side, the STA may perform one or more discovery operations to determine if the feature (e.g., the use of a pre-determined frame to indicate the presence of buffered data traffic) is enabled on the AP. For example, the discovery operation(s) can be performed by the STA at association if the AP is advertising the feature.

Although the invention is illustrated and described herein with reference to specific embodiments, the invention is not intended to be limited to the details shown. Rather, various modifications may be made in the details within the scope and range of equivalents of the claims and without departing from the invention.

It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

Throughout this specification, unless the context clearly requires otherwise, the word "comprise", or variations such as "comprises" or "comprising", will be understood to imply the inclusion of a stated element, integer or step, or group of elements, integers, or steps, but not the exclusion of any other element, integer or step, or group of elements, integers, or steps.

Any discussion of documents, acts, materials, devices, articles or the like which has been included in the present specification is solely for the purpose of providing a context for the present technology. It is not to be taken as an admission that any or all these matters form part of the prior art base or were common general knowledge in the field relevant to the present technology as it existed before the priority date of each claim of this specification.

Figure 8:
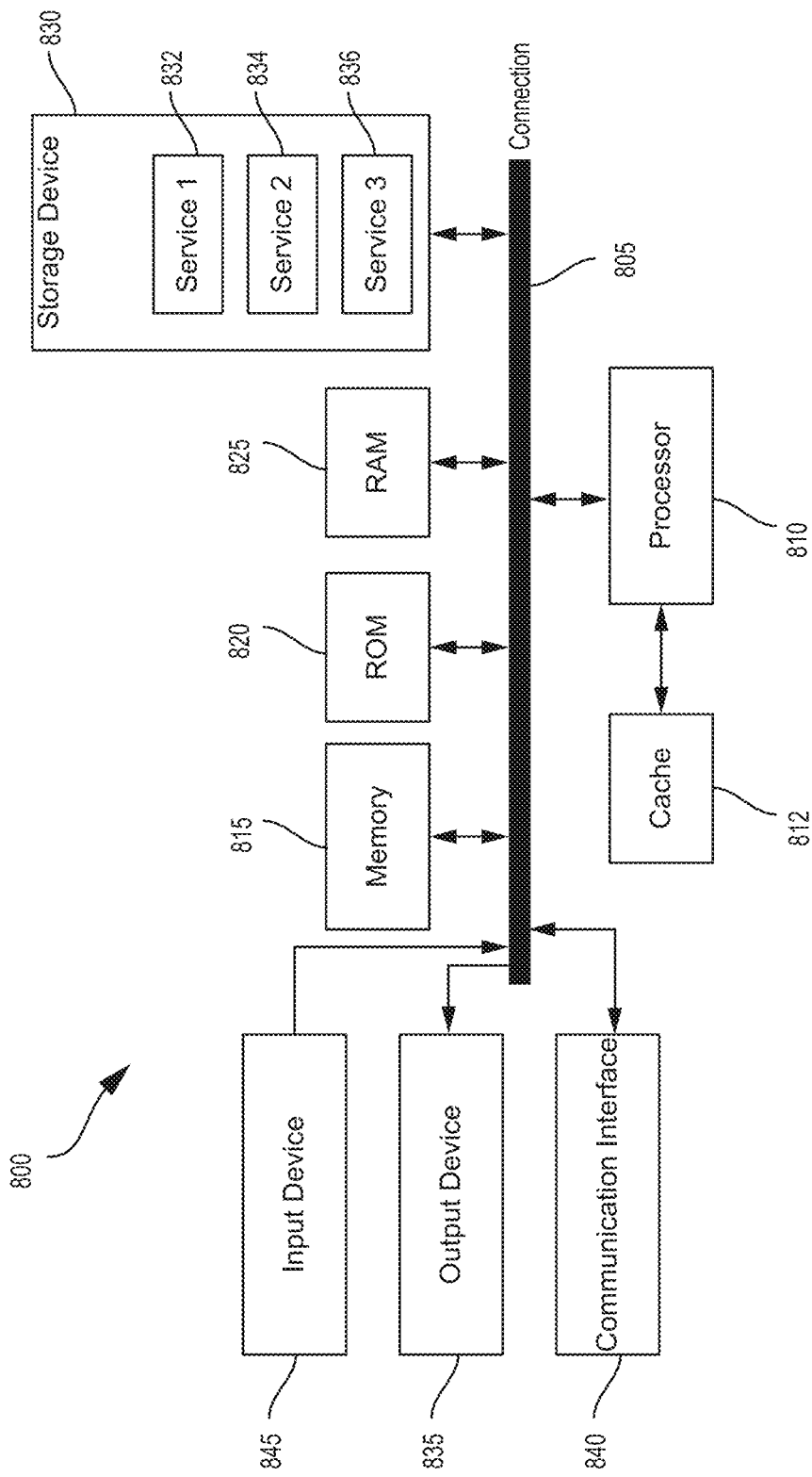
FIG. 8 is a block diagram illustrating an example of a computing system for implementing certain aspects described herein, in accordance with some examples.

FIG. 8 illustrates an example computing device architecture 800 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 800 are shown in electrical communication with each other using connection 805, such as a bus. The example computing device architecture 800 includes a processing unit (CPU or processor) 810 and computing device connection 805 that couples various computing device components including computing device memory 815, such as read only memory (ROM) 820 and random-access memory (RAM) 825, to processor 810.

Computing device architecture 800 can include a cache of high-speed memory connected directly with, in close proximity to, or integrated as part of processor 810. Computing device architecture 800 can copy data from memory 815 and/or the storage device 830 to cache 812 for quick access by processor 810. In this way, the cache can provide a performance boost that avoids processor 810 delays while waiting for data. These and other engines can control or be configured to control processor 810 to perform various actions. Other computing device memory 815 may be available for use as well. Memory 815 can include multiple different types of memory with different performance characteristics. Processor 810 can include any general-purpose processor and a hardware or software service, such as service 1 832, service 2 834, and service 3 836 stored in storage device 830, configured to control processor 810 as well as a special-purpose processor where software instructions are incorporated into the processor design. Processor 810 may be a self-contained system, containing multiple cores or processors, a bus, memory controller, cache, etc. A multi-core processor may be symmetric or asymmetric.

To enable user interaction with the computing device architecture 800, input device 845 can represent any number of input mechanisms, such as a microphone for speech, a touch-sensitive screen for gesture or graphical input, keyboard, mouse, motion input, speech and so forth. Output device 835 can also be one or more of a number of output mechanisms known to those of skill in the art, such as a display, projector, television, speaker device, etc. In some instances, multimodal computing devices can enable a user to provide multiple types of input to communicate with computing device architecture 800. Communication interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. Storage device 830 can include services 832, 834, 836 for controlling processor 810. Other hardware or software modules or engines are contemplated. Storage device 830 can be connected to the computing device connection 805. In one aspect, a hardware module that performs a particular function can include the software component stored in a computer-readable medium in connection with the necessary hardware components, such as processor 810, connection 805, output device 835, and so forth, to carry out the function.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method for wireless communication by a wireless access point (AP), the method comprising:
    determining if the wireless AP has buffered data traffic that will be advertised to one or more wireless communication devices in a beacon frame scheduled for broadcast by the wireless AP, wherein the wireless AP and the one or more wireless communication devices are included in a same wireless local area network (WLAN);
    in response to determining that buffered data traffic is not available for the one or more wireless communication devices, broadcasting, using the wireless AP, a pre-determined frame on the WLAN to signal the buffered data traffic is not available; and
    broadcasting, using the wireless AP, a beacon frame on the WLAN for the one or more wireless communication devices.

2. The method of claim 1, wherein the pre-determined frame is a null data packet (NDP) frame, and the NDP frame comprises one or a combination of a clear to send (CTS) frame, a NDP paging frame, and a clear to send-to-self (CTS-to-self) frame.

3. The method of claim 2, further comprising adjusting a CTS duration parameter of the CTS frame, wherein the CTS duration parameter is indicative of one or more network conditions or network configurations signaled by the wireless AP to the one or more wireless communication devices.

4. The method of claim 1, wherein the wireless AP broadcasts the pre-determined frame at a target beacon transmission time (TBTT) associated with the beacon frame.

5. The method of claim 4, wherein the wireless AP broadcasts the beacon frame using a pre-determined offset after the TBTT.

6. The method of claim 1, wherein the wireless AP broadcasts the pre-determined frame before a target beacon transmission time (TBTT) associated with the beacon frame.

7. The method of claim 6, wherein:
    the wireless AP broadcasts the pre-determined frame using an offset time interval relative to the TBTT; and
    the offset time interval is determined as a sum of a transmission time associated with the wireless AP broadcasting the pre-determined frame and a short inter-frame space (SIFS) time associated with the one or more wireless communication devices.

8. The method of claim 1, wherein determining if the wireless AP has buffered data traffic comprises:
    checking, using the wireless AP, for buffered group addressed data addressed to the one or more wireless communication devices.

9. The method of claim 8, wherein determining that buffered data traffic is not available is based on checking, using the wireless AP, a bitmap control byte, a partial virtual bitmap (PVB), or both the bitmap control byte and the PVB included in a traffic indication map (TIM) element of the beacon frame.

10. The method of claim 1, wherein the pre-determined frame is the beacon frame, and the beacon frame comprises a signal field configured to signal that the buffered data traffic is not available.

11. The method of claim 1, further comprising:
    determining a pre-determined timeout period indicating a maximum time allowed for continuously broadcasting the pre-determined frames before broadcasting the beacon frames; and
    skip broadcasting the pre-determined frame when an elapsed time from the wireless AP continuously broadcasting the pre-determined frames is greater than the pre-determined timeout period.

12. A wireless access point (AP), comprising:
    a modem;
    a processor communicatively coupled with the modem; and
    a memory communicatively coupled with the processor and storing processor-readable codes that, when executed by the processor in conjunction with the modem, is configured to:
        determine if the wireless AP has buffered data traffic that will be advertised to one or more wireless communication devices in a beacon frame scheduled for broadcast by the wireless AP;
        in response to determining that buffered data traffic is not available for the one or more wireless communication devices, broadcast a pre-determined frame on a wireless local area network (WLAN) associated with the wireless AP and the one or more wireless communication devices to signal the buffered data traffic is not available; and
        broadcast a beacon frame on the WLAN.

13. The wireless AP of claim 12, wherein the pre-determined frame is a null data packet (NDP) frame, and the NDP frame comprises one or a combination of a clear to send (CTS) frame, a NDP paging frame, and a clear to send-to-self (CTS-to-s elf) frame.

14. The wireless AP of claim 13, wherein the processor is further configured to:
    signal one or more network conditions or network configurations to the one or more wireless communication devices based on adjusting a CTS duration parameter of the CTS frame.

15. The wireless AP of claim 12, wherein the processor is configured to:
    broadcast the pre-determined frame at or before a target beacon transmission time (TBTT) associated with the beacon frame.

16. A method for wireless communication by a wireless communication device, the method comprising:
    exiting, by the wireless communication device, a low-power mode in order to receive an upcoming beacon frame scheduled for broadcast on a wireless local area network (WLAN) by a wireless access point (AP);
    receiving a pre-determined frame broadcast on the WLAN by the wireless AP;
    determining, based on receiving the pre-determined frame, that the upcoming beacon frame does not advertise buffered data traffic addressed to the wireless communication device; and returning, by the wireless communication device, to the low-power mode after decoding at least a portion of the pre-determined frame.

17. The method of claim 16, wherein the wireless communication device returns to the low-power mode prior to the wireless AP transmitting the upcoming beacon frame or the wireless communication device skips receiving the upcoming beacon frame.

18. The method of claim 16, wherein exiting the low-power mode is based on a target beacon transmission time (TBTT) associated with the upcoming beacon frame scheduled for broadcast on the WLAN.

19. The method of claim 18, wherein:
the wireless communication device exits the low-power mode before the TBTT associated with the upcoming beacon frame;
the wireless communication device receives the pre-determined frame at an offset time interval relative to the TBTT; and
the offset time interval is determined as a sum of a transmission time associated with the wireless AP broadcasting the pre-determined frame and a short inter-frame space (SIFS) time associated with the wireless communication device.

20. The method of claim 16, wherein the wireless communication device returning to the low-power mode is further based on:
determining that an elapsed time since the wireless communication device last received or decoded a beacon frame broadcast from the wireless AP is less than a pre-determined timeout period.

21. The method of claim 20, further comprising:
in response to the elapsed time being greater than or equal to the pre-determined timeout period, waiting to receive the upcoming beacon frame, wherein the upcoming beacon frame is broadcast on the WLAN by the wireless AP after the pre-determined frame.

22. The method of claim 21, further comprising:
receiving the upcoming beacon frame broadcast on the WLAN by the wireless AP;
synchronizing an internal timing synchronization function (TSF) time associated with the wireless communication device with a TSF time associated with the wireless AP;
resetting the elapsed time value to zero; and
returning, by the wireless communication device, to the low-power mode after performing TSF time synchronization.

23. The method of claim 16, wherein:
the pre-determined frame is the upcoming beacon frame, the upcoming beacon frame including a signal field configured to indicate a presence of the buffered data traffic; and
the wireless communication device returns to the low-power mode after decoding the signal field of the beacon frame and without processing the entire beacon frame, based on the signal field indicating that the buffered data traffic is not available.

24. The method of claim 16, wherein the pre-determined frame is a null data packet (NDP) frame, and the NDP frame comprises one or a combination of a clear to send (CTS) frame, a NDP paging frame, and a clear to send-to-self (CTS-to-self) frame.

25. The method of claim 24, further comprising:
determining a CTS duration parameter associated with the CTS frame, wherein the CTS duration parameter is indicative of one or more network conditions or network configurations signaled by the wireless AP to the wireless communication device.

26. A wireless communication device, comprising:
a modem;
a processor communicatively coupled with the modem; and
a memory communicatively coupled with the processor and storing processor-readable codes that, when executed by the processor in conjunction with the modem, is configured to:
exit a low-power mode in order to receive an upcoming beacon frame scheduled for broadcast on a wireless local area network (WLAN) by a wireless access point (AP);
receive a pre-determined frame broadcast on the WLAN by the wireless AP;
determine, based on receiving the pre-determined frame, that the upcoming beacon frame does not advertise buffered data traffic addressed to the wireless communication device; and
returning, by the wireless communication device, to the low-power mode after decoding at least a portion of the pre-determined frame.

27. The wireless communication device of claim 26, wherein the processor is further configured to cause the wireless communication device to:
return to the low-power mode prior to the wireless AP transmitting the upcoming beacon frame or return to the low-power mode without receiving the upcoming beacon frame.

28. The wireless communication device of claim 26, wherein the wireless communication device returning to the low-power mode is further based on:
determining that an elapsed time since the wireless communication device last received or decoded a beacon frame broadcast from the wireless AP is less than a pre-determined timeout period.

29. The wireless communication device of claim 28, wherein the processor is further configured to cause the wireless communication device to:
in response to the elapsed time being greater than or equal to the pre-determined timeout period, wait to receive the upcoming beacon frame, wherein the upcoming beacon frame is broadcast on the WLAN by the wireless AP after the pre-determined frame.

30. The wireless communication device of claim 29, wherein the processor is further configured to cause the wireless communication device to:
receive the upcoming beacon frame broadcast on the WLAN by the wireless AP;
synchronize an internal timing synchronization function (TSF) time associated with the wireless communication device with a TSF time associated with the wireless AP;
reset the elapsed time value to zero; and
return to the low-power mode after performing TSF time synchronization.

* * * * *